US006455636B2

(12) United States Patent
Sanada

(10) Patent No.: US 6,455,636 B2
(45) Date of Patent: Sep. 24, 2002

(54) THERMOPLASTIC RESIN COMPOSITION

(75) Inventor: Takashi Sanada, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/759,256

(22) Filed: Jan. 16, 2001

(30) Foreign Application Priority Data

Jan. 19, 2000 (JP) ........................................ 2000-009840

(51) Int. Cl.$^7$ .............................. C08F 8/00; C08L 71/12
(52) U.S. Cl. .................... 525/132; 525/133; 525/240
(58) Field of Search ................................ 525/132, 133, 525/240

(56) References Cited

U.S. PATENT DOCUMENTS

| 4,801,645 A | | 1/1989 | Nishio et al. | |
| 4,863,997 A | * | 9/1989 | Shibuya et al. | ............... 525/92 |
| 5,189,103 A | | 2/1993 | Abe et al. | |
| 5,587,427 A | | 12/1996 | Abe et al. | |

FOREIGN PATENT DOCUMENTS

| JP | 62-223217 | 10/1987 |
| JP | 63-113058 | 5/1988 |
| JP | 63-225642 | 9/1988 |
| JP | 3-227361 | 10/1991 |
| JP | 3-231945 | 10/1991 |
| JP | 8-199014 | 8/1996 |
| JP | 8-217926 | 8/1996 |

* cited by examiner

Primary Examiner—Duc Truong
(74) Attorney, Agent, or Firm—Sughrue Mion, PLLC

(57) ABSTRACT

There is disclosed a thermoplastic resin composition comprising;
(i) 30 to 94% by weight of a polypropylene (A),
(ii) 5 to 69% by weight of a polyphenylene ether (B), and
(iii) 1 to 50% by weight of a copolymer (C), provided that a total weight of the components (A), (B) and (C) is 100% by weight, wherein the copolymer (C) has a molar ratio of a structural unit derived from the α-olefin represented by the following formula (I) to a structural unit derived from ethylene of not less than (0.8/(3n+2)/1, $$CH_2=CH-(CH_2)_nCH_2CH_3 \qquad (I)$$

wherein n is an integer of 0 to 10.

6 Claims, 1 Drawing Sheet

THERMOPLASTIC RESIN COMPOSITION

FIELD OF THE INVENTION

The present invention relates to a thermoplastic resin composition. More specifically, the present invention relates to a thermoplastic resin composition comprising a polypropylene and a polyphenylene ether, which composition has a superior balance between its heat resistance and its impact resistance. The composition can be suitably used in an electric field, an electronic field, a car field and others including fields of various industrial materials.

BACKGROUND OF THE INVENTION

As disclosed in JP-A 62-223217, JP-A63-113058, JP-A 63-225642, JP-A 3-227361 and JP-A 3-231945, a resin composition comprising a polypropylene and a polyphenylene ether is known.

More particularly, JP-A 62-223217 discloses a thermoplastic resin composition, which can be obtained by blending a polyphenylene ether, a modified polyolefin composition and an epoxy compound, and which has a superior heat resistance, mechanical properties and processability.

JP-A 63-113058 discloses a thermoplastic resin composition, which can be obtained by blending (i) a polyolefin, (ii) a polyphenylene ether, (iii) a polymer having both a polymerized chain of an alkenyl aromatic compound and an aliphatic hydrocarbon chain in the polymer molecule, and (iv) a diamide compound, and which has a superior balance in mechanical properties, molding processability and solvent resistance.

JP-A63-225642 discloses a resin composition comprising a polyolefin resin, a polyphenylene ether resin and a partially hydrogenated alkenyl aromatic compound-conjugated diene block copolymer, which composition has a particularly superior balance in mechanical properties such as rigidity, and has a superior molding processability, oil resistance and chemical resistance.

JP-A 3-227361 discloses a resin composition, which can be obtained by melt-kneading a polyphenylene ether, a polyolefin and a specific functional compound, and which has a particularly improved impact resistance.

And JP-A 3-231945 discloses a resin composition, which can be obtained by blending (i) a melt-kneaded product among a polyolefin, a polyphenylene ether and a specific functional compound and (ii) a specific polar compound.

However, each of the above-mentioned resin compositions does not have a superior balance between its heat resistance and impact resistance, while a thermoplastic resin composition comprising a polypropylene and a polyphenylene ether, and having a superior balance between its heat resistance and its impact resistance has been desired.

SUMMARY OF THE INVENTION

An object of the present invention is to provide a thermoplastic resin composition comprising a polypropylene and a polyphenylene ether, which is superior in balance between its heat resistance and its impact resistance.

The inventor of the present invention has undertaken studies to develop a thermoplastic resin composition comprising a polypropylene and a polyphenylene ether, which has a superior balance between its heat resistance and its impact resistance. As a result, it has been found that a combination of a specific ethylene-α-olefin copolymer with a polypropylene and a polyphenylene ether, or further a combination of a specific ethylene-α-olefin copolymer with a polypropylene, a polyphenylene ether and a compatibilizer can give a thermoplastic resin composition having a superior balance between its heat resistance and its impact resistance, which composition has a superior flowability due to the polypropylene, and a superior heat resistance and rigidity due to the polyphenylene ether. Thereby, the present invention has been obtained.

The present invention provides a thermoplastic resin composition comprising:

(i) 30 to 94% by weight of a polypropylene (A), (ii) 5 to 69% by weight of a polyphenylene ether (B), and (iii) 1 to 50% by weight of a copolymer (C), provided that a total weight of the components (A), (B) and (C) is 100% by weight, wherein the copolymer (C) has a molar ratio of a structural unit derived from the α-olefin represented by the following formula (I) to a structural unit derived from ethylene of not less than (0.8/(3n+2))/1,

$$CH_2=CH-(CH_2)_nCH_2CH_3 \quad (I)$$

wherein n is an integer of 0 to 10.

Further, the present invention provides a thermoplastic resin composition comprising:

(i) 30 to 94% by weight of a polypropylene (A), (ii) 5 to 69% by weight of a polyphenylene ether (B), (iii) 1 to 50% by weight of a copolymer (C), and (iv) a compatibilizer (D) in an amount enough to compatibilize the above component (A) with the component (B), provided that a total weight of the components (A), (B) and (C) is 100% by weight, wherein the copolymer (C) has a molar ratio of a structural unit derived from the α-olefin represented by the above-mentioned formula (I) to a structural unit derived from ethylene of not less than (0.8/(3n+2))/1.

Still further, the present invention provides a thermoplastic resin composition obtained by melt-kneading:

(i) 30 to 94% by weight of a polypropylene (A), (ii) 5 to 60% by weight of a polyphenylene ether (B), (iii) 1 to 50% by weight of a copolymer (C), and (iv) a compatibilizer (D) in an amount enough to compatibilize the above component (A) with the component (B), provided that a total weight of the components (A), (B) and (C) is 100% by weight, wherein the copolymer (C) has a molar ratio of a structural unit derived from the α-olefin represented by the above-mentioned formula (I) to a structural unit derived from ethylene of not less than (0.8/(3n+2))/1.

DETAILED DESCRIPTION OF THE INVENTION

Figure 1:
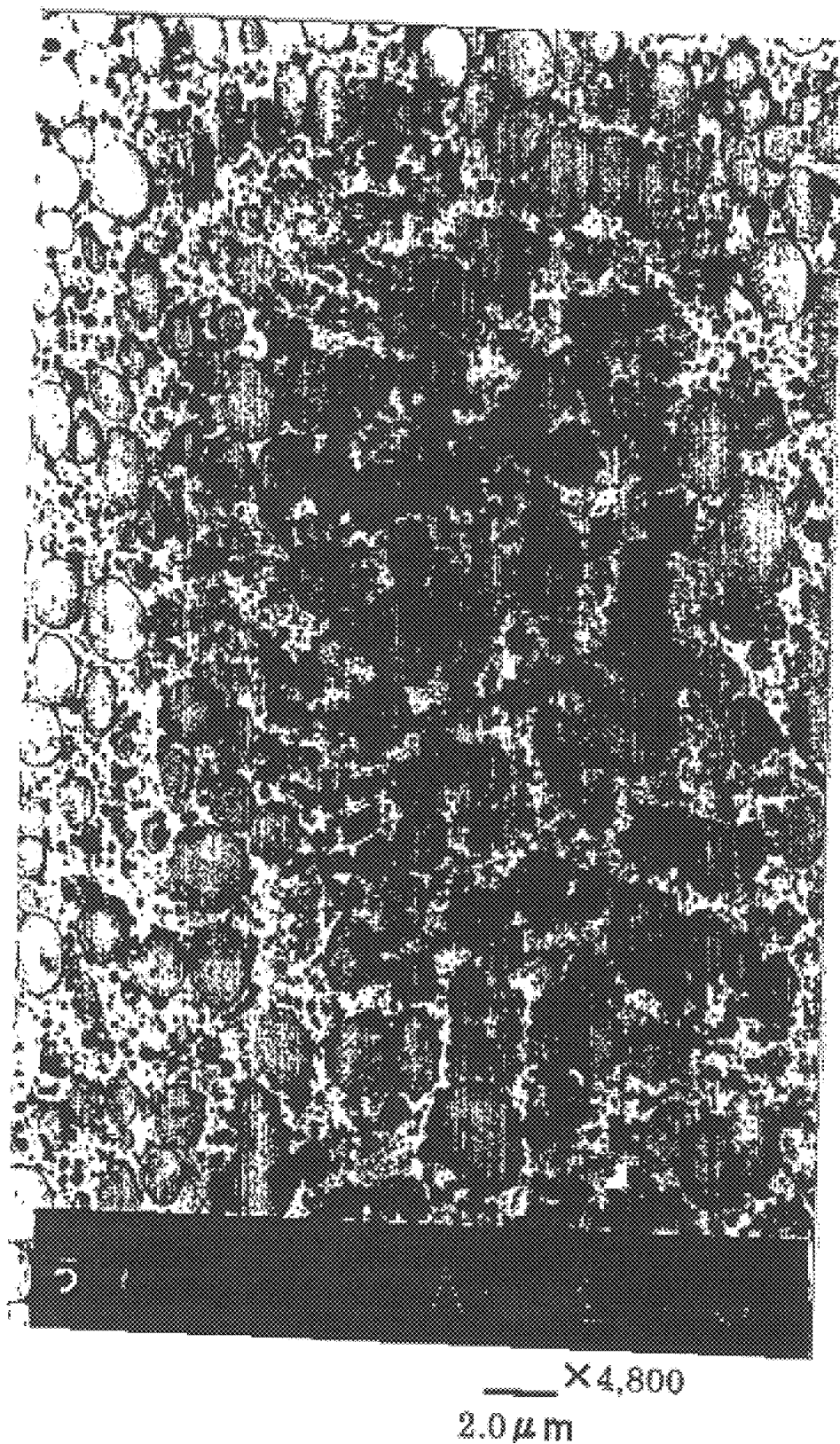
FIG. 1 is a photograph of a dyed very thin slice with a transmission electron microscope. The dyed very thin slice was obtained by cutting off a test piece from its center portion with a microtome, followed by dying with RuO$_4$ (whereby a polyphenylene ether (larger particles) is dyed lightly, and an ethylene-octene copolymer (smaller particles) is dyed deeply), and the test piece was prepared for measuring flexural modulus of the thermoplastic resin composition obtained in Example 2.

A "polypropylene" used in the present invention means a thermoplastic homopolymer or copolymer containing 50 to 100% by weight of a structural unit derived from propylene and 0 to 50% by weight of a structural unit derived from at least one olefin of 2 to 8 carbon atoms other than propylene. Here, a total weight of the structural unit derived from propylene and that derived from the olefin other than propylene is 100% by weight.

Examples of the polypropylene are a crystalline homopolymer of propylene, a crystalline block copolymer of propylene with a comonomer selected from the group consisting of ethylene and α-olefins other than propylene, and a mixture of said crystalline homopolymer of propylene and said block copolymer. Examples of the α-olefin are butene-1 and hexene-1. As the above-mentioned block copolymer, a polymer obtained through a first step of polymerizing propylene alone and a second step of random-polymerizing propylene with the above-mentioned comonomer in the presence of the propylene homopolymer obtained in the first step can be exemplified, The resulting polymer is substantially a mixture of the propylene homopolymer and the random copolymer of propylene with the comonomer. Said block copolymer is a well known polymer having a superior impact resistance, which can be produced through a slurry polymerization or a gas phase polymerization (refer to, for example, U.S. Pat. Nos. 4,900,706 and 4,820,775).

The polypropylene used in the present Invention can be obtained according to a polymerization process using a titanium type catalyst a support type catalyst or a homogeneous type catalyst such as a metallocene. Because physical properties of the polypropylene usually have an effect on characteristics of the composition in accordance with the present invention, it is recommendable to use a polypropylene superior in balance of physical properties such as impact strength and rigidity.

A polyphenylene ether used in the present invention is a well known polymer, which can be obtained by oxidatively polymerizing at least one phenol compound represented by the following formula (II) with oxygen or an oxygen-containing gas with the aid of an oxidative coupling catalyst. The polyphenylene ether is an important component to give heat resistance to the resin composition in accordance with the present invention.

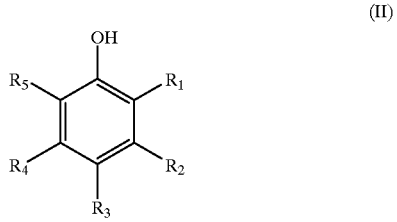

(II)

In the above formula (II), $R_1$, $R_2$, $R_3$, $R_4$ and $R_5$ are independently of one another hydrogen, a halogen atom, a hydrocarbon group or a substituted hydrocarbon group, provided that at least one of them is always a hydrogen atom.

Examples of $R_1$, $R_2$, $R_3$, $R_4$ and $R_5$ in the formula (II) are hydrogen, chlorine, bromine, fluorine, iodine, methyl, ethyl, n-propyl, iso-propyl, pri-butyl, sec-butyl, t-butyl, chloroethyl, hydroxyethyl, phenylethyl, benzyl, hydroxymethyl, carboxyethyl, methoxycarbonylethyl, cyanoethyl, phenyl, chlorophenyl, methylphenyl, dimethylphenyl, ethylphenyl and allyl.

Examples of the compound represented by the formula (II) are phenol, o-cresol, m-cresol, p-cresol, 2,6-dimethylphenol, 2,5-dimethylphenol, 2,4-dimethylphenol, 3,5-dimethylphenol, 2-methyl-6-phenylphenol, 2,6-diphenylphenol, 2,6-diethylphenol, 2-methyl-6-ethylphenol, 2,3,5-trimethylphenol, 2,3,6-trimethylphenol, 2,4,6-trimethylphenol, 3-methyl-6-t-butylphenol, thymol and 2-methyl-6-allylphenol.

In the present invention, the polyphenylene ether also means a copolymer of a phenol compound other than that represented by the formula (II), for example, a polyhydroxy aromatic compound such as bisphenol-A, tetrabromobisphenol-A, resorcinol, hydroquinone and novolak resins, with the compound represented by the formula (XI).

Examples of preferred polyphenylene ether are a homopolymer of 2,6-dimethyl-1,4-phenylene ether, and a random copolymer of 2,6-dimethyl-1,4-phenylene ether with 2,3,6-trimethyl-1,4-phenylene ether.

A process for producing the polyphenylene ether used in the present invention is not particularly limited. For example, it can be produced by oxidatively polymerizing 2,6-xylenol with the aid of a complex of a cuprous salt with an amine as a catalyst according to a process described in U.S. Pat. No. 3,306,874, or by other processes described in U.S. Pat. Nos. 3,306,875 and 3,257,358, JP-B 52-17880, JP-A 50-51197 and JP-A 63-152628.

The polyphenylene ether used in the present invention can be used suitably in combination with polystyrene, high impact polystyrene, syndiotactic polystyrene or rubber-reinforced syndiotactic polystyrene. With respect to a blending proportion, the latter is used in an amount of not exceeding 500 parts by weight, preferably not more than 200 parts by weight based on 100 parts by weight of the polyphenylene ether.

Examples of the α-olefin represented by the above-mentioned formula (I) are butene, pentene, hexene, heptene, octene, nonene, decene, undecene, and dodecene. Of these, octene and decene are preferred. It is permitted to use a copolymer having structure units derived from at least two kinds of the α-olefin. In this case, for example, in the case where two kinds of the α-olefins are used, the expression of "not less than $(0.8/(3n+2))1$" holds against respective α-olefins as shown below, wherein the amount of ethylene is alloted against respective α-olefins in a suitable proportion for the sake of convenience.

(1) Mole number of the ethylene structural unit in the copolymer is assigned to be "x+y".

(2) The symbol "n" of a first α-olefin structural unit in said copolymer is assigned to be "$n^1$", and a mole number thereof is assigned to be "$a^1$".

(3) The symbol "n" of a second α-olefin structural unit in said copolymer is assigned to be "$n^2$", and a mole number thereof is assigned to be "$a^2$".

(4) Then, $x+y+a^1+a^2=1$.

(5) When an optional x and an optional y are elected, the following both expressions hold with respect to at least one combination of x and y.

$a^1/x \geq (0.8/(3n^1+2))1$ $a^2/y \geq (0.8/(3n^2+2))/1$

A molar ratio of a structural unit derived from the α-olefin in the copolymer to a structural unit derived from ethylene in the copolymer is not less than $(0.8/(3n+2)/1$, and preferably not less than $(1/(3n+2)/1$. The symbol, n, in the expression showing that the molar ratio has the same meaning as that in the formula (I). When the ratio is less than (0.8/(3n+

2)/1, the obtained thermoplastic resin composition has inferior impact resistance, and as a result, it is impossible to obtain a desired resin composition superior in balance between its heat resistance and its impact resistance. The symbol, n, stands for an integer of 0 to 10, preferably an integer of 2 to 10, and more preferably an integer of 4 to 10. When n exceeds 10, it may happen that a desired resin composition superior in balance between its heat resistance and its impact resistance cannot be obtained. The α-olefin having a larger n value can give the thermoplastic resin composition far superior in its impact resistance; that is, for example, when two copolymers have the same molar ratio of a structural unit derived from the α-olefin to a structural unit derived from the ethylene, the copolymer comprising a structural unit having a larger n value can give the thermoplastic resin composition far superior in its impact resistance than the copolymer comprising a structural unit derived from the α-olefin having a smaller n value.

A "compatibilizer" used in the present invention means a $2n/y \geq (0.8/(3n^2+2))1$ a compound capable of improving compatibility between the polypropylene and the polyphenylene ether. It is well known that the compatibility between the polypropylene and the polyphenylene ether is not good. Therefore, it is recommendable to use the polypropylene, the polyphenylene ether or the ethylene-α-olefin copolymer in combination with the compatibilizer in order to improve the compatibility between the polypropylene and the polyphenylene ether.

Examples of the compatibilizer are:

(1) a compound containing in the molecule both (i) a polypropylene segment and (ii) a polyphenylene ether segment, (2) a compound containing in the molecule both (i) a polypropylene segment and (ii) a segment having a good molecular miscibility or a good molecular affinity to the polyphenylene ether, (3) a compound containing in the molecule both (i) a polyphenylene ether segment and (ii) a segment having a good molecular miscibility or a good molecular affinity to the polypropylene, and (4) a compound containing in the molecule both (i) a segment having a good molecular miscibility or a good molecular affinity to the polypropylene and (ii) a segment having a good molecular miscibility or a good molecular affinity to the polyphenylene.

As the compatibilizer categorized in the above item (1), a block copolymer or a graft copolymer obtained by chemically bonding the polyphenylene ether with the polypropylene is enumerated as an example. More particularly, such a copolymer can be produced, for example, by coupling a reaction product between the polyphenylene ether and maleic anhydride with a reaction product between the polypropylene and maleic anhydride with the aid of a diamine, a diisocyanate or a polyfunctional epoxy compound.

As the compatibilizer categorized the above item (2), a block copolymer or a graft copolymer between the polypropylene and a polystyrene is exemplified.

As the compatibilizer categorized in the above item (3), a block copolymer or a graft copolymer between the polyphenylene ether and an ethylene-butene copolymer is exemplified.

As the compatibilizer categorized in the above item (4), a polymer obtained by hydrogenating a di- or tri-block copolymer of styrene and butadiene, and a polymer obtained by hydrogenating a di- or tri-block copolymer of styrene and isoprene are exemplified.

The compatibilizer used in the present invention may be compounds mentioned in the above items (1) to (4). which compounds are separately prepared in advance, (manner-1); or precursory compounds capable of producing any compound such as compounds mentioned in the above items (1) to (4) in the process of producing the thermoplastic resin composition in accordance with the present invention, (manner-2).

For example, JP-A 63-113058 and JP-A 62-225642 can be enumerated as known references relating to the manner-1. In these references, there is disclosed a polymer obtained by hydrogenating a block copolymer comprising at least one block of an alkenyl aromatic compound such as styrene and a block of a conjugated diene compound such as butadiene, in which polymer the unsaturated bonds of the conjugated diene compound block are hydrogenated. When the hydrogenated polymer is used in the present invention, a molecular weight of at least one alkenyl aromatic compound block in said polymer is preferably not less than 10,000 ,and more preferably not less than 15,000. In order to obtain the thermoplastic resin composition having a good heat resistance, a proportion of the alkenyl aromatic compound block in the hydrogenated polymer is preferably not less than 50% by weight, and more preferably not less than 60% by weight, based on 100% by weight of said polymer. Generally speaking, from a viewpoint of obtaining the thermoplastic resin composition superior in its heat resistance, it is preferred to use the polymer obtained by hydrogenating the block copolymer having many vinyl groups, which groups are those in the conjugated diene compound block; and, on the other hand, from a viewpoint of obtaining the thermoplastic resin composition superior in its impact resistance, it is preferred to use the polymer obtained by hydrogenating the block copolymer having a few vinyl groups. However, in the present invention, either the polymer obtained by hydrogenating the block copolymer having many vinyl groups or the polymer obtained by hydrogenating the block copolymer having a few vinyl groups may be used.

With respect to the manner-2, there is exemplified a process, which comprises the step of melt-kneading a mixture containing the polypropylene, the polyphenylene ether, the above-mentioned ethylene-α-olefin copolymer and maleic anhydride, wherein said maleic anhydride produces a compatibilizer under said melt-kneading; namely, substantially all of maleic anhydride reacts with both a part of the polypropylene and a part of the polyphenylene ether to produce a compatibilizer under said melt-kneading. Said compatibilizer, which is categorized in the above item (1), is formed in a manner such that the polypropylene segment and the polyphenylene ether segment are bonded with each other through the maleic anhydride residue. For example, JP-A 3-2227361 and JP-A3-231945 are enumerated as known references relating to the manner-2.

In the present invention, the compatibilizer is used in an amount enough to compatibilize the polypropylene with the polyphenylene ether. When the compatibilizer is used in such an amount, the resulting thermoplastic resin composition has a preferred morphology as mentioned below, and has more preferred mechanical properties in comparison with the thermoplastic resin composition obtained by using no compatibilizer. A preferred amount of the compatibilizer is from 1 to 50 parts by weight based on 100 parts by weight of a total weight of the polypropylene and the polyphenylene ether.

From a viewpoint of obtaining a resin composition superior in balance between its heat resistance and its impact resistance, it is preferred for the thermoplastic resin composition in accordance with the present invention to have a morphology such that a dispersed phase of the polyphenylene ether is present in a matrix phase of the polypropylene. A diameter of a particle forming the dispersed phase is preferably not more than 3 μm, and more preferably not more than 2 μm, hereinafter the particle being referred to as "dispersed particle". With respect to the above-mentioned ethylene-α-olefin copolymer in the thermoplastic resin composition in accordance with the present invention, it is preferred that about 50% by weight or more thereof are present as the dispersed phase, and a dispersed particle diameter thereof is preferably not more than 0.5 μm, and more preferably not more than 0.2 μm.

A shape of the dispersed particle present in a molded article obtained by molding the thermoplastic resin composition is variable from a nearly spherical shape to a deformed spherical shape depending on molding conditions such as a shearing stress in an injection molding. Therefore, unless otherwise particularly specified, the "dispersed particle diameter" in the present invention means a diameter of a dispersed particle present in an almost center portion of a molded article, which particle is not substantially affected by a shearing stress. Said particle diameter is obtained through the following steps (1) to (5).

(1) oxidation dying a sample with a heavy metal compound such as $RuO_4$ (ruthenium tetraoxide), (2) cutting off the dyed sample with a cutter such as an ultra-microtome, thereby obtaining a very thin slice, (3) taking a photograph of photograph with a transmission electron microscope, thereby obtaining a photograph of, for example, 10,000 magnifications.

(4) measuring respective diameters of individual dispersed particles in the photograph, and (5) calculating an additional average value from the diameters measured, which average value is defined as a diameter of the dispersed particle.

When a content of the polypropylene is less than 30% by weight, the resin composition obtained has a poor flowability, and results in unsatisfactory molding processability. When a content of the polyphenylene ether is less than 5% by weight, the resin composition obtained has an unsatisfactory heat resistance. When a content of the copolymer is less than 1% by weight, the resin composition obtained has an unsatisfactory impact resistance. On the other hand, when a content of the copolymer exceeds 50% by weight, the resin composition obtained has an unsatisfactory heat resistance.

A process for producing the thermoplastic resin composition in accordance with the present invention is not particularly limited. As the most preferred industrial process, for example, a process comprising melt-kneading the above-mentioned components can be enumerated. A preferred melt-kneading machine is, for example, a multi screw extruder having two or more screws, to which extruder a kneading block can be added at any position of the screws. If desired, it is allowable that the extruder is provide with a first material-supplying inlet and a second material-supplying inlet, and further third and forth material-supplying inlets in this order from the upper stream to the down stream along the flow direction of a material to be kneaded. Further, if desired, a vacuum vent may be added at an optional position of the extruder.

Respective components (A) to (D) mentioned above may be used in combination with other components as long as the effects of the present invention can be obtained. Examples of said other components are antioxidants; metal deactivators; flame redarders such as organic phosphate type compounds, ammonium polyphosphate type flame retarders, aromatic halide type flame retarders and silicone type flame retarders: fluoropolymers; impact resistance-giving elastomers such as hydrogenated block copolymers; plasticizers such as low molecular weight polyethylene, epoxidized soybean oil, polyethylene glycol and fatty acid esters; flame retarding auxiliaries such as antimony trioxide; weather resistance (light resistance) improving agents: nucleating agents for polyolefin; slipping agents; inorganic or organic fillers or reinforcing materials such as polyacrylonitrile fibers, calcium carbonate, magnesium carbonate, aluminum hydroxide, magnesium hydroxide,zinc oxide, titanium oxide, magnesium oxide, aluminum silicate, magnesium silicate, calcium silicate, silicic acid, hydrous calcium silicate, hydrous aluminum silicate, mica, mineral fibers, xonotlite, potassium titanate whiskers, magnesium oxysulfate, glass balloons, glass fibers, glass beads, carbon fibers, inorganic fibers including stainless steel fibers, aramid fibers, carbon black, conductive metal fibers and conductive carbon black; coloring agents, and mold releasing agents.

The resin composition in accordance with the present invention can be formed Into a molded article such as a sheet, a film and parts of every kind according to a known molding method such as compression molding, injection molding, extrusion molding, multi-layer extrusion molding, profile extrusion molding and blow molding methods. Good examples of the parts of every kind are, for example, car parts and internal and external parts of electric appliances. The car parts include, for example, external parts such as bumpers, fenders, door panels, braids of every kind, emblems, engine hoods, wheel caps, roofs, spoilers and various aero-parts, and internal parts such as instrument panels, console boxes and trims. The internal and external parts of electric appliances include, for example, computers and related instruments thereof; chassis and cabinets used for office automation instruments other than computers, televisions, videos and various disc players; molded articles for secondary battery bath; and parts for refrigerators.

EXAMPLE

The present invention is illustrated in more detail with reference to Examples, which are only illustrative and not to be construed as limiting the scope of the present invention. The components used, preparation method of test pieces and test methods are as follows.

1. Component (A): Polypropylene

A homopolypropylene, a grade name of HD100G2, manufactured by Sumitomo Chemical Co., Ltd., hereinafter referred to as "PP".

2. Component (B): Polyphenylene ether

Poly(2,6-dimethyl-1,4-phenylene ether), a trade mark of PP0640, manufactured by General Electric Co., hereinafter referred to as "PPE".

3. Component (C): Copolymer

An ethylene-octene copolymer (content of structure unit derived from octane=24% by weight). a grade name of EG8200, manufactured by Dow Chemical Co., hereinafter referred to as "EOR".

4. Component (D): Compatibilizer (1) Diaminododecane, hereinafter referred to as "DADD".

(2) Maleic anhydride, hereinafter referred to as "MAH".

(3) A peroxide, a trademark of PERKADOX 14/40C, manufactured by Kayaku Akzo Corporation, hereinafter referred to as "peroxide".

(4) A hydrogenated styrene-butadiene-styrene block copolymer (weight ratio of styrene block to hydrogenated butadiene block=67/33), a trade mark of TUFTEC H1043, manufactured by Asahi Chemical Industry Co., Ltd., hereinafter referred to as "SEBS".

5. Other components
(1) Impact resistance improving agent
① A hydrogenated styrene-isoprene block copolymer, a trade mark of SEP G1701X, manufactured by Shell Chemical Co., hereinafter referred to as "SEP".
② An ethylene-propylene copolymer, a trade mark of EPR V0111, manufactured by Sumitomo Chemical Co., Ltd., hereinafter referred to as "EPR".
(2) A polystyrene, a trade mark of SUMIBRITE G690N, manufactured by Japan Poly Styrene Inc., hereinafter referred to as "PS".
(3) A pigment, a trade mark of EPC865, manufactured by Sumika Color Co., LTD, hereinafter referred to as "pigment".
(4) Additives
① Calcium stearate, hereinafter referred to as "Cast".
② An antioxidant, a trade mark of Irganox 1010, manufactured by Ciba Specialty Chemicals LTD, hereinafter referred to as "Irg 1010".
③ An antioxidant, a trade mark of ULTRANOX 626, manufactured by Borg-Werrner, hereinafter referred to as "U626".
④ A nucleating agent, a trade mark of MARK NA-11, manufactured by Asahi Denka Kogyo K. K., hereinafter referred to as "NA-11".
⑤ A peroxide prepared by diluting 1,3-bis(t-butylperoxy isopropyl)benzene with a polypropylene to a concentration of 8% by weight, hereinafter referred to as "PO".

6. Preparation method of test pieces

The pellet obtained was dried at 120° C. for 3 hours in a hot air oven, and the pellet dried was formed into test pieces of every kind with an extrusion molding machine (a cylinder temperature of 260° C., and a mold temperature of 50° C.), a trade mark of IS220EN, fabricated by Toshiba Machine Co., Ltd.

7. Test method
(1) Melt index (MI)

MI (dg/min) was measured using the dried pellet mentioned above under conditions of 230° C. and a load of 10 kg.

(2) Tensile elongation

A tensile elongation test was carried out under atmosphere of 23° C. according to ASTM D638 to obtain the tensile elongation (%).

(3) Flexural modulus

A flexural modulus (MPa) at 23° C. was measured using a test piece of 1/8 inch thickness according to ASTM D790.

(4) Izod impact strength

A 1/8 inch notched izod impact strength (KJ/m$^2$) was measured at 23° C., according to ASTM D256.

(5) Heat deformation temperature (HDT)

HDT (°C.) under a load of 18.6 kg was measured using a test piece of 1/4 inch thickness according to ASTM D648.

Examples 1 and 2 and Comparative Example 1

Respective components were fed to a twin screw kneading extruder, a trade mark of TEM 50, fabricated by Toshiba Machine Co., Ltd., through three material-supplying inlets of No. 1 to 3 provided to said extruder to be melt-kneaded at a cylinder temperature of 260° C.

The melt-kneaded product was extruded from dies into a water bath, and the product cooled was cut with a strand cutter to obtain a thermoplastic resin composition in a pellet form. Amounts (parts by weight) of the components and the inlets through which the components were fed are shown in Table 1. Test results are as shown in Table 1.

Regarding the thermoplastic resin composition obtained in Example 2, a test piece prepared for measuring flexural modulus was cut off from its center portion with a microtome, thereby obtaining a very thin slice, and then the resulting slice was dyed with $RuO_4$. The dyed very thin slice was observed with a transmission electron microscope. The photograph obtained is as shown in FIG. 1.

TABLE 1

|  | Inlet No. | Example 1 | Example 2 | Comparative Example 1 |
|---|---|---|---|---|
| Component (A) |  |  |  |  |
| PP | 1 | 40 | 30 | 40 |
| PP | 2 | 20 | 10 | 20 |
| PP | 3 | — | 10 | — |
| Component (B) |  |  |  |  |
| PPE | 1 | 40 | 40 | 40 |
| Component (C) |  |  |  |  |
| EOR | 2 | 10 | 9 | — |
| Component (D) |  |  |  |  |
| MAH | 1 | 1 | 1 | 1 |
| Peroxide | 1 | 0.25 | 0.4 | 0.25 |
| DADD | 2 | 1 | 1 | 1 |
| SEBS | 2 | — | 1 | — |
| Other components |  |  |  |  |
| SEP | 2 | — | — | 2 |
| EPR | 2 | — | — | 5 |
| PS | 1 | — | 10 | — |
| Pigment | 1 | 0.5 | 0.5 | 0.5 |
| Cast | 2 | 0.05 | 0.05 | 0.05 |
| Irg1010 | 2 | 0.1 | 0.1 | 0.1 |
| U626 | 2 | 0.1 | 0.1 | 0.1 |
| NA-11 | 2 | — | 0.1 | — |
| PO | 3 | — | 0.5 | — |
| MI (dg/min) |  | 17.5 | 19.1 | 9.5 |
| Tensile elongation (%) |  | 58 | 38 | 27 |
| Flexural modulus (MPa) |  | 1490 | 1530 | 1340 |
| Izod impact test (KJ/M$^2$) |  | 4.7 | 5.3 | 2.8 |
| HDT (° C.) |  | 135 |  | 120 |

What is claimed is:

1. A thermoplastic resin composition comprising:
    (i) 30 to 94% by weight of a polypropylene (A),
    (ii) 5 to 69% by weight of a polyphenylene ether (B), and
    (iii) 1 to 50% by weight of a copolymer (C), provided that a total weight of the components (A), (B) and (C) is 100% by weight,
wherein the copolymer (C) has a molar ratio of a structural unit derived from ethylene of not less than (0.8/(3n+2)/1, $$CH_2=CH-(CH_2)_nCH_2CH_3 \qquad (I)$$

wherein n is an integer of 0 to 10.

2. The thermoplastic resin composition according to claim 1, wherein n in the formula (I) is an integer of 2 to 10.

3. A thermoplastic resin composition comprising:
    (i) 30 to 94% by weight of a polypropylene (A),
    (ii) 5 to 69% by weight of a polyphenylene ether (B),
    (iii) 1 to 50% by weight of a copolymer (C), and
    (iv) a compatibilizer (D) in an amount enough to compatibilize the above component (A) with the component (B), provided that a total weight of the components (A), (B) and (C) is 100% by weight, wherein the copolymer (C) has a molar ratio of a structural unit derived from the α-olefin represented by the following formula (I) to a structural unit derived from ethylene of not less than (0.8/(3n+2)/1,

    (I)

wherein n is an integer of 0 to 10.

4. The thermoplastic resin composition according to claim 3, wherein n in the formula (I) is an integer of 2 to 10.

5. A thermoplastic resin composition obtained by melt-kneading:

(i) 30 to 94% by weight of a polypropylene (A), (ii) 5 to 69% by weight of a polyphenylene ether (B), (iii) 1 to 50% by weight of a copolymer (C), and (iv) a compatibilizer (D) in an amount enough to compatibilize the above component (A) with the component (B), provided that a total weight of the components (A), (B) and (C) is 100% by weight, wherein the copolymer (C) has a molar ratio of a structural unit derived from the α-olefin represented by the following (I) to a structural unit derived from ethylene of not less than (0.8/(3n+2)/1,

    (I)

wherein n is an integer of 0 to 10.

6. The thermoplastic resin composition according to claim 5, wherein n in the formula (I) is an integer of 2 to 10.

* * * * *